US007770154B2

(12) United States Patent
Lam et al.

(10) Patent No.: US 7,770,154 B2
(45) Date of Patent: Aug. 3, 2010

(54) LIGHTWEIGHT HIGHLY AVAILABLE INFRASTRUCTURE TO TRACE PROGRAM EXECUTION

(75) Inventors: Ivan Tinlung Lam, Santa Clara, CA (US); Sunil Kumar, Foster City, CA (US); Alok Kumar Srivastava, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1400 days.

(21) Appl. No.: 11/173,675

(22) Filed: Jul. 1, 2005

(65) Prior Publication Data

US 2007/0006165 A1 Jan. 4, 2007

(51) Int. Cl.
*G06F 9/45* (2006.01)

(52) U.S. Cl. .................................................... 717/128

(58) Field of Classification Search .................. 717/128
See application file for complete search history.

(56) References Cited

U.S. PATENT DOCUMENTS 6,202,199 B1 * 3/2001 Wygodny et al. ........... 717/125
6,708,173 B1 * 3/2004 Behr et al. .................... 707/10
7,058,928 B2 * 6/2006 Wygodny et al. ........... 717/128

* cited by examiner

*Primary Examiner*—John Chavis
(74) *Attorney, Agent, or Firm*—Hickman Palermo Truong & Becker LLP

(57) ABSTRACT

A portable tracing utility provides trace configuration, trace instrumentation and trace management functionality for single or multithreaded programs. Through various application programming interfaces ("APIs") of the tracing utility, a client may control tracing behavior to setup in-memory data structures for storing trace records that record the program's history of execution or to alter the granularity of execution history being traced. The trace behavior can be modified during the life of a program by using the APIs, either dynamically when the program assumes certain states, or through remote procedure calls issued by, for example, an external interface. Programs are instrumented with these APIs to record the history of execution, which during execution of the program is stored in circular in-memory buffers.

36 Claims, 2 Drawing Sheets

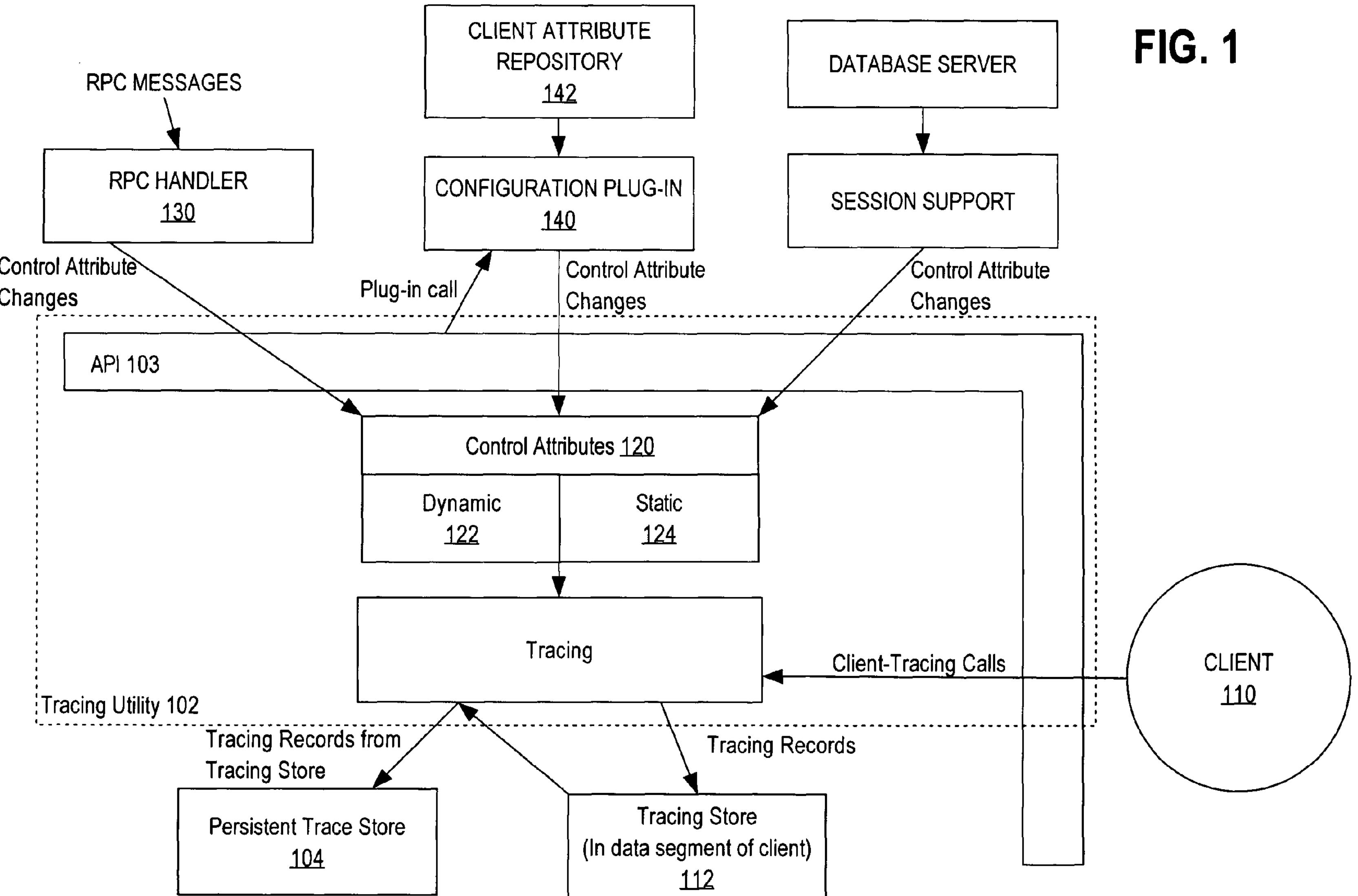
TRACING SYSTEM ARCHITECTURE 101
FIG. 1
RPC MESSAGES
RPC HANDLER 130
CLIENT ATTRIBUTE REPOSITORY 142
CONFIGURATION PLUG-IN 140
DATABASE SERVER
SESSION SUPPORT
Control Attribute Changes
Plug-in call
Control Attribute Changes
Control Attribute Changes
API 103
Control Attributes 120
Dynamic 122
Static 124
Tracing
Client-Tracing Calls
CLIENT 110
Tracing Utility 102
Tracing Records from Tracing Store
Tracing Records
Persistent Trace Store 104
Tracing Store (In data segment of client) 112

SERVER 230
INTERNET
ISP
228
226
LOCAL NETWORK 222
HOST 224
NETWORK LINK
220
200
STORAGE DEVICE 210
ROM 208
MAIN MEMORY 206
BUS
202
COMMUNICATION INTERFACE 218
PROCESSOR 204
DISPLAY 212
INPUT DEVICE 214
CURSOR CONTROL 216

LIGHTWEIGHT HIGHLY AVAILABLE INFRASTRUCTURE TO TRACE PROGRAM EXECUTION

FIELD OF THE INVENTION

The present invention relates to tracing execution history of a program, and in particular, implementing portable utilities that facilitate and standardize the implementation of tracing.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It is often useful to know the execution history of a program to analyze the underlying software and resolve defects and performance issues. Programs analyzed can be single threaded programs or be complex multithreaded execution entities.

Tools for analyzing programs include debuggers that attach to a program to perform step-by-step or breakpoint-by-breakpoint execution to examine the current contents of program data structures at a particular step or breakpoint. Although this approach gives a peek into the state of the program at an instant of the program's execution, the approach provides no history of execution. Despite the lack of execution history, these type of debuggers may be useful for analyzing simple programs. However for analyzing complex programs on live production systems, the lack of execution history impairs the usefulness of these types of debuggers as a tool for analyzing programs.

Programs sometimes store trace records in persistent storage, such as files on disks that capture the execution history. However, this approach involves significant runtime overhead. The overhead causes programmers to restrict tracing to such a degree that the ability to effectively perform first pass diagnosis when a problem occurs is substantially impaired.

Based on the foregoing, there is clearly a need to provide a mechanism that allows tracing to be implemented in a way that reduces overhead.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram of a tracing architecture according to an embodiment of the present invention.

DETAILED DESCRIPTION OF THE INVENTION

Figure 2:
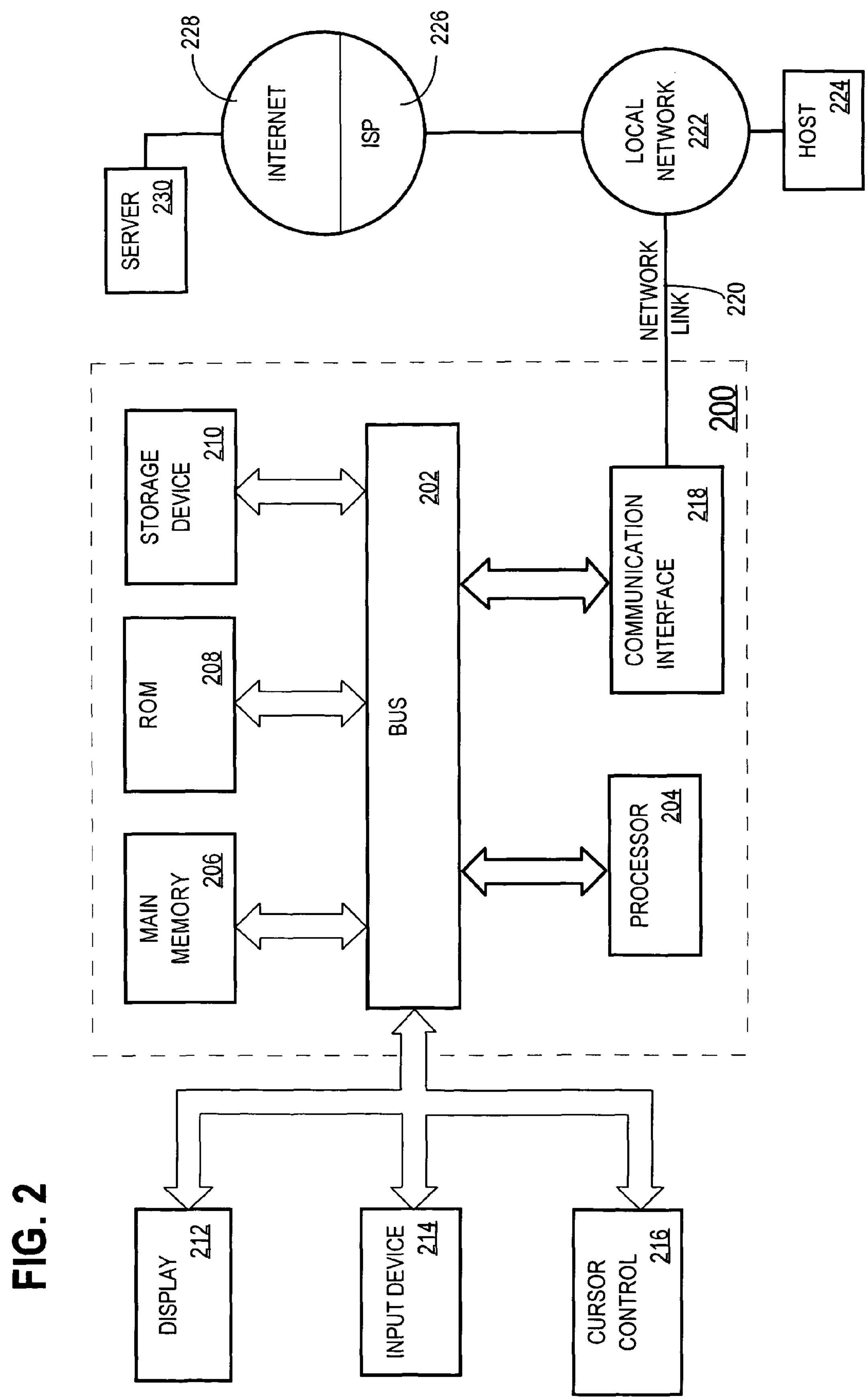
FIG. 2 is a block diagram of a computer system that may be used to implement an embodiment of the present invention.

A method and apparatus for tracing is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A portable tracing utility provides trace configuration, trace instrumentation and trace management functionality for single or multithreaded programs. Through various application programming interfaces ("APIs") of the tracing utility, a client may control tracing behavior to setup in-memory data structures for storing trace records that record the program's history of execution or to alter the granularity of execution history being traced. The trace behavior can be modified during the life of a program by using the APIs, either dynamically when the program assumes certain states, or through remote procedure calls issued by, for example, an external interface. Programs are instrumented with these APIs to record the history of execution, which during execution of the program is stored in circular in-memory buffers.

Illustrative Implementation

FIG. 1 is a block diagram depicting a tracing system architecture that uses a tracing utility according to an embodiment of the present invention. Referring to FIG. 1, it shows tracing utility 102.

A utility, such as tracing utility 102, is a set of interrelated routines (functions, procedures, subroutines) that provide a particular specialized functionality to another set of routines, referred to herein as clients. Clients interact with a utility through an API, which is a set of routines of a utility that are exposed to clients, that is, routines that may be referenced by code in the client and called during execution of the client. An example of such a routine is a function with one or more arguments that is invoked by a client.

A utility handles details of a particular functionality; many data structures that a utility generates are internal to its routines and may not be accessed by clients of the utility. The behavior of a utility can be controlled by a client through APIs. Data and/or information a utility provides to a client is provided through the API or through output stored in storage structures accessible to the client.

For purposes of exposition, software modules, such as client 110 and tracing utility 102, are described herein as performing particular actions, when in fact execution of the software by a process causes the process to perform those actions. For example, when client 110 is described as calling an API function or accessing data, a process executing the application software is calling the API function or accessing the data.

Utilities are typically developed by vendors and development teams different from those that develop clients. Developers and/or vendors that develop client software are referred to herein as client implementers.

Tracing utility 102 provides tracing functionality to clients, such as client 110. A client controls the behavior of tracing utility 102 by invoking API 103. To record a particular point of execution within client 110, client 110 calls at that particular point a routine of API 103 referred to herein as a trace function.

Client 110 may register with tracing utility 102 one or more components by which to trace execution. This allows tracing to be tracked and managed according to components that a client implementer may define for the client. Also, a client may specify the granularity of tracing by specifying one or more tracing levels. The higher the tracing level, the greater the granularity.

Tracing Store

To record the execution history of client 110, trace records are stored in an in-memory (e.g. volatile memory, virtual memory) data structure referred to as a tracing store. The trace records are retained in the in-memory tracing store, that is, the trace records are not necessarily written to persistent storage after being stored in the tracing store. According to an embodiment, a tracing store, such as tracing store 112, is a circular buffer within the data segment of a process executing a client. A data segment is memory allocated to a process to store interim data created by the process's execution of a client. Other processes cannot access the memory while it is allocated to the process. For this reason, the data segment can be accessed very efficiently because, for example, contention with other processes for access to the memory of the data segment does not have to be coordinated with other processes, as in the case of accessing shared memory shared by processes. A circular buffer is a buffer in which data is written at the beginning of the buffer. Afterwards, when the buffer has been filled with data, data is written at the beginning of buffer again, overwriting data previously stored there.

At times, it is useful to persistently store the contents of a tracing store. To this end, tracing utility 102 may dump all the records stored in tracing store 112 to persistent trace store 104, which may be, for example, a file.

Alternatively, trace records are archived. Specifically, trace records are written to persistent storage automatically. Archiving prevents trace records from being overwritten.

According to an embodiment, a separate tracing store is used to track the history of each client component being traced. A client may specify different sizes for the tracing store of each component.

Because each component has a dedicated tracing store, tracing of one component does not affect the tracing store of another component. Thus, trace records generated for one component do not overwrite trace records of another component. This reduces the likelihood that trace records of a component with light tracing activity are overwritten by the trace records of a component with relatively heavy tracing activity.

Control Attributes

Control attributes 120 are attributes (e.g. variables) whose state governs the behavior of tracing utility 102. Control attributes 120 specify, for example, whether tracing is enabled and for what tracing level, what client components to trace, the size of a component's tracing store, whether trace records for a particular component are archived, and the resource management facilities to manage resources used by tracing (e.g. memory management routines, file access routines).

Control attributes 120 include two types of control attributes, which are dynamic attributes 122 and static attributes 124. Static attributes are control attributes that can only be set when tracing is initialized. Dynamic attributes can be set any time tracing is occurring for a client.

Configuration Plug-in and Client Attribute Repository

Client 110 may specify a configuration plug-in 140 that is called by tracing utility 102 to initialize some or all of the control attributes. When configuration plug-in 140 is called, it sets the control attributes by invoking one or more functions of API 103. The configuration plug-in 140 allows client implementers to implement their own logic for controlling the behavior of tracing utility 102. Client 110 may specify its preferred resource management facilities, such as memory management and IO routines, in configuration plug-in 140, so that these resource management facilities will replace the original defaults used by tracing utility 102 after initialization.

According to an embodiment, configuration plug-in 140 accesses a client attribute store 142, which stores information about how to configure control attributes. The client attribute store may be configured or maintained by the client or other external software according to any format desired by a developer. This allows client implementers or other developers to develop and use their own customized configuration interfaces ("tracing configuration interface") for configuring tracing utility 102. The tracing configuration interfaces store information about configuring tracing utility 102 in client attribute store 142. To configure tracing utility 102 according to information stored in client attribute store 142, tracing utility 102 invokes configuration plug-in 140, which in turns configures tracing utility 102 in the way defined by client attribute store 142 and according to logic implemented within configuration plug-in 140.

The configuration plug-in is useful for defining and establishing default and/or initial tracing behavior for client 110. When other types of behavior are desired, the behavior may be changed dynamically, as described below. Also, the tracing configuration interface may be used to change the default tracing behavior, temporarily or permanently.

Changing Tracing Behavior Dynamically

Remote procedure call (RPC) handler 130 is a routine being executed by a thread of a process that executes client 110. RPC handler 130 listens for RPC messages. A remote procedure call is a call of a routine made by a process in which another process, on the same or different node and/or computer, executes the called routine. The other process is referred to as the remote process. The call is made by transmitting an RPC message that requests execution of a routine to another process over a communication connection, such as a network connection. Also, input parameters and output parameters are transmitted over the connection and may be included in the message.

RPC messages received by RPC handler 130 may specify some desired behavior and/or action by tracing utility 102, to which RPC handler 130 may respond by invoking API 103 to effect the behavior and/or action. For example, an RPC message may request that contents of tracing store 112 be dumped to persistent trace store 104 or that tracing for a particular component be commenced. When RPC handler 130 receives an RPC message, RPC handler 130 responds, according to the logic with which it is implemented, by calling API 103 to cause tracing utility 102 to dump tracing store 112 to persistent trace store 104 or to cause tracing utility 102 to commence tracing for a particular component.

In general, the RPC handler 130 is implemented as one or more routines of client 110. This entails and allows development of an RPC handler by client implementers.

The RPC messages can be generated by an interface being executed by a process external to any client process. The RPC messages can be directed to a client process on a computer system. The interface can be customized to the tracing needs of the client and its client implementers

Trace Records Generated by Client API Calls

Trace records are generated in response to execution of an invocation of a "trace function" of API 103 within client 110. To record a particular execution at a point within client 110, client 110 includes an invocation of a trace function at that point.

According to an embodiment of the present invention, a client invocation of a trace function specifies a component, tracing level, and operation. For a particular execution of a call of a trace function, tracing utility 102 generates a trace record, so long as tracing is active for that component and active for that tracing level.

Viewing Tracing History

The trace records in persistent trace store 104 may be viewed through any external process executing a "trace viewing tool". An external process is a process different than that being traced. The trace viewing tool may be used to examine the execution history of a client by a process after the process has terminated. In addition, the execution history may be viewed on-demand while the process is still executing the client, by causing tracing utility 102 to dump its contents to persistent trace store 104 and examining the execution history recorded therein.

Furthermore, when an execution failure and program dump occurs, the trace records might be available in program dumps. If so, the trace records can be examined using trace viewing tools. This provides information about a first failure instance that can be used to analyze and debug client code.

Transparent Tracing of Utilities

Client software often makes use of many utilities. As mentioned before, such utilities are separate components typically developed and maintained by development teams separate from the team that develops the client. It is important that these developers be able to develop their software independently with as little coordination as possible.

Using the tracing approaches described herein, developers of utilities may independently add tracing functionality to utilities without having to coordinate with developers of client software that make use of those utilities. Because the performance impact of in-memory tracing is minimal, the tracing of a utility is performed in a way that minimizes impact upon the performance of end-user computer systems running the client software. In this way, execution of utilities is traced in a way that is transparent to client software and users that use it.

Diagnostic-States

According to an embodiment, the states of various combinations of control attributes are defined as a diagnostic-state. Through API 103, tracing utility 102 may be set to these diagnostic-states. For example, to cease all archiving of trace records for all components, tracing utility 102 may by default define a diagnostic-state of NO-ARCHIVE. By invoking API 103, tracing utility 102 may be set to the NO-ARCHIVE diagnostic-state, causing tracing utility 102 to cease all archiving of trace records by setting, for each component, the state of the control attribute that is needed to cease archiving for that component.

Diagnostic-states may be user-defined, allowing users to establish states of various combinations of control attributes as a diagnostic-state. A client may define a diagnostic-state by registering a diagnostic-state with tracing utility 102 through API 103. When the client calls API 103 to register a diagnostic-state, the client supplies a diagnostic-state identifier (e.g. a "string") and "diagnostic-state plug-in". The diagnostic-state is reached by calling a function of API 103 and identifying the desired diagnostic state in the call. This causes the diagnostic-state plug-in for the diagnostic state to be invoked. The diagnostic-state plug-in is used to set control attributes to the state that is associated with the diagnostic state, and/or to otherwise perform what ever logic needed to reach the state.

For example, to increase the amount of information traced for a component of client 110 that opens files ("OPEN-FILE"), client 110 registers a diagnostic-state identified as TRACK-OPEN-FILE and a diagnostic-state plug-in. To set tracing utility 102 to the diagnostic-state TRACK-OPEN-FILE, client 110 invokes API 103. Alternatively, an RPC message may be sent to RPC message handler 130. Setting the tracing utility 102 to the diagnostic-state TRACK-OPEN-FILE causes tracing utility 102 to call the diagnostic plug-in registered for this diagnostic state. The diagnostic-state plug-in sets control attributes as needed to cause tracing utility 102 to trace client component OPEN-FILE at a particular tracing level. The diagnostic-state plug-in sets the attributes via a call to API 103.

According to an embodiment, client 110 registers a DEFAULT diagnostic-state and diagnostic-state plug-in for the DEFAULT diagnostic-state. When tracing utility 102 receives a request to "turn off" a diagnostic-state, it sets itself to the DEFAULT diagnostic-state by calling the diagnostic-state plug-in registered by the client.

Diagnostic-state plug-ins may be used to not only set control attributes associated with a diagnostic state, but also to perform operations unrelated to tracing utility 102.

Database System Implementation

According to an embodiment of the present invention, client 110 is a database server, such as a database server available from Oracle corporation (Oracle, 9i, 10i, 11g). The database server is configured to use tracing utility 102 to trace various components defined by the database server. The tracing utility may be controlled through commands issued in a database session.

A database session is established for a client process in order for the client process to interact with a database server. A database session is a particular connection established for a client to a database server through which the client issues a series of requests for execution of command statements. The statements substantially conform to a database language supported by the database server, such as SQL, and include data definition language ("DDL") statements, data manipulation language ("DML") statements, and statements used to configure a database server. One or more processes executing within the session execute the statements.

According to an embodiment, the database language includes commands for altering the behavior of the tracing utility. This allows the behavior of a tracing utility to be modified by issuing commands within a database session to a database server.

Hardware Overview

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for facilitating tracing of execution of software, comprising:

a tracing utility receiving calls from a client through a function of an API exposed by the tracing utility to clients of the tracing utility;

in response to receiving said calls, said tracing utility generating trace records about the execution of the client by a process on a computer system;

wherein control attributes of said tracing utility govern how said tracing utility traces said execution of the client by said process;

wherein said API includes one or more functions that require setting the control attributes; and said tracing utility setting said at least one control attribute of said control attributes in response to calls made by said client through said API during said execution of the client by said process;

wherein source code for said client comprises an invocation of said function of said API; and wherein the method is performed by one or more computing devices.

2. The method of claim 1, wherein the steps further include retaining the trace records in an in-memory data structure within a data segment of said process.

3. The method of claim 2, wherein the in-memory data structure is a circular buffer.

4. The method of claim 2, the steps further including:

the tracing utility receiving through the API a request to store contents of the in-memory data structure to a persistent store; and in response to receiving the request, storing said contents to a certain persistent store.

5. The method of claim 2, the steps further including:

receiving from the client a certain routine for managing memory for the in-memory data structure; and using the certain routine to manage memory for the in-memory data structure.

6. The method of claim 1, the steps further including:

receiving from the client via the API a certain routine for managing a resource used by said tracing utility; and using the certain routine to manage said resource.

7. The method of claim 1, the steps further including:

receiving from the client via the API components by which to organize tracing of said execution of the client by said process; and wherein said tracing utility generating trace records includes generating trace records that track said execution of the client by said process by said components.

8. The method of claim 7, the steps further including:

receiving a call from the client via the API to generate a trace record;

wherein the call specifies a component of said components; and wherein generating trace records includes said tracing utility generating a trace record associated with said component in response to receiving the call.

9. The method of claim 7, the steps further including storing trace records in a separate data structure for each component of said components.

10. The method of claim 1, wherein the steps further include:

receiving via the API from the client components by which to organize tracing of said execution of the client by said process; and wherein said tracing utility generating trace records includes generating trace records that track said execution of the client by said process by said components.

11. The method of claim 1, wherein the steps further include:

receiving via the API from the client a certain trace level that indicates a level of granularity for said generating said trace records; and wherein said generating trace records includes generating trace records based on the trace level.

12. The method of claim 11, the steps further including:

receiving a call from the client via the API to generate a trace record;

wherein the call specifies a particular trace level; and generating a trace record based on the particular trace level and the certain trace level.

13. The method of claim 1, the steps further including:

said tracing utility receiving via the API from the client a configuration plug-in to initialize said control attributes; and calling said configuration plug-in to initialize said control attributes.

14. The method of claim 1, the steps further including:

said tracing utility receiving a remote procedure call that requires changing at least one of said control attributes; and in response to receiving said remote procedure call, said tracing utility changing said at least one of said control attributes.

15. The method of claim 1, the steps further including:

a database server receiving a database statement; and in response to receiving said database statement, said database server causing modification to at least one of said control attributes.

16. The method of claim 1, the steps further including:

the tracing utility receiving a call to set the tracing utility to a diagnostic-state;

wherein said diagnostic-state is associated with the state of a set of said control attributes; and in response to receiving a call to set the tracing utility to a diagnostic-state, setting the set of control attributes to the respective state associated with the diagnostic-state.

17. The method of claim 16, the steps further including receiving from the client a call to register a diagnostic-state.

18. The method of claim 17, the steps further including receiving from the client a call to register a diagnostic-state includes receiving a routine; and wherein execution of said routine causes setting the control attributes to the respective state associated with the diagnostic-state.

19. A computer-readable storage medium storing one or more sequences of instructions which, when executed by one or more processors, causes the one or more processors to perform a method for facilitating tracing of execution of software, said method comprising steps of:

a tracing utility receiving calls from a client through a function of an API exposed by the tracing utility to clients of the tracing utility;

in response to receiving said calls, said tracing utility generating trace records about the execution of the client by a process on a computer system;

wherein control attributes of said tracing utility govern how said tracing utility traces said execution of the client by said process;

wherein said API includes one or more functions that require setting the control attributes;

said tracing utility setting said at least one control attribute of said control attributes in response to calls made by said client through said API during said execution of the client by said process;

wherein source code for said client comprises an invocation of said function of said API; and wherein the method is performed by one or more computing devices.

20. The computer-readable storage medium of claim 19, wherein the steps further include retaining the trace records in an in-memory data structure within a data segment of said process.

21. The computer-readable storage medium of claim 20, wherein the in-memory data structure is a circular buffer.

22. The computer-readable storage medium of claim 20, the steps further including:

the tracing utility receiving through the API a request to store contents of the in-memory data structure to a persistent store; and in response to receiving the request, storing said contents to a certain persistent store.

23. The computer-readable storage medium of claim 20, the steps further including:

receiving from the client a certain routine for managing memory for the in-memory data structure; and using the certain routine to manage memory for the in-memory data structure.

24. The computer-readable storage medium of claim 19, the steps further including:

receiving from the client via the API a certain routine for managing a resource used by said tracing utility; and using the certain routine to manage said resource.

25. The computer-readable storage medium of claim 19, the steps further including:

receiving from the client via the API components by which to organize tracing of said execution of the client by said process; and wherein said tracing utility generating trace records includes generating trace records that track said execution of the client by said process by said components.

26. The computer-readable storage medium of claim 25, the steps further including:

receiving a call from the client via the API to generate a trace record;

wherein the call specifies a component of said components; and wherein generating trace records includes said tracing utility generating a trace record associated with said component in response to receiving the call.

27. The computer-readable storage medium of claim 25, the steps further including storing trace records in a separate data structure for each component of said components.

28. The computer-readable storage medium of claim 19, wherein the steps further include:

receiving via the API from the client components by which to organize tracing of said execution of the client by said process; and wherein said tracing utility generating trace records includes generating trace records that track said execution of the client by said process by said components.

29. The computer-readable storage medium of claim 19, wherein the steps further include:

receiving via the API from the client a certain trace level that indicates a level of granularity for said generating said trace records; and wherein said generating trace records includes generating trace records based on the trace level.

30. The computer-readable storage medium of claim 29, the steps further including:

receiving a call from the client via the API to generate a trace record;

wherein the call specifies a particular trace level; and generating a trace record based on the particular trace level and the certain trace level.

31. The computer-readable storage medium of claim 19, the steps further including:

said tracing utility receiving via the API from the client a configuration plug-in to initialize said control attributes; and calling said configuration plug-in to initialize said control attributes.

32. The computer-readable storage medium of claim 19, the steps further including:

said tracing utility receiving a remote procedure call that requires changing at least one of said control attributes; and in response to receiving said remote procedure call, said tracing utility changing said at least one of said control attributes.

33. The computer-readable storage medium of claim 19, the steps further including:

a database server receiving a database statement; and in response to receiving said database statement, said database server causing modification to at least one of said control attributes.

34. The computer-readable storage medium of claim 19, the steps further including:

the tracing utility receiving a call to set the tracing utility to a diagnostic-state;

wherein said diagnostic-state is associated with the state of a set of said control attributes; and in response to receiving a call to set the tracing utility to a diagnostic-state, setting the set of control attributes to the respective state associated with the diagnostic-state.

35. The computer-readable storage medium of claim 34, the steps further including receiving from the client a call to register a diagnostic-state.

36. The computer-readable storage medium of claim 35, the steps further including receiving from the client a call to register a diagnostic-state includes receiving a routine; and wherein execution of said routine causes setting the control attributes to the respective state associated with the diagnostic-state.

* * * * *

UNITED STATES PATENT AND TRADEMARK OFFICE

CERTIFICATE OF CORRECTION

PATENT NO. : 7,770,154 B2
APPLICATION NO. : 11/173675
DATED : August 3, 2010
INVENTOR(S) : Ivan Tinlung Lam et al.

It is certified that error appears in the above-identified patent and that said Letters Patent is hereby corrected as shown below:

In column 4, line 51, delete "implementers" and insert -- implementers. --, therefor.

In column 8, line 56, in claim 1, after "attributes;" delete "and".

Signed and Sealed this
Tenth Day of May, 2011

David J. Kappos
*Director of the United States Patent and Trademark Office*